(12) United States Patent
Kim

(10) Patent No.: US 10,401,191 B2
(45) Date of Patent: Sep. 3, 2019

(54) SYSTEM FOR GUIDING ROUTE BASED ON USE PATTERN OF DRIVING ASSISTANT SYSTEM AND METHOD THEREOF

(71) Applicants: Hyundai Motor Company, Seoul (KR); Kia Motors Corporation, Seoul (KR)

(72) Inventor: Sung Un Kim, Yongin-si (KR)

(73) Assignees: Hyundai Motors Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/831,044

(22) Filed: Dec. 4, 2017

(65) Prior Publication Data

US 2019/0113363 A1   Apr. 18, 2019

(30) Foreign Application Priority Data

Oct. 13, 2017  (KR) .................... 10-2017-0133439

(51) Int. Cl.
  *G01C 21/34*   (2006.01)
  *G01C 21/36*   (2006.01)
  *G07C 5/00*    (2006.01)
  *G07C 5/08*    (2006.01)
  *G06Q 10/00*   (2012.01)

(52) U.S. Cl.
  CPC ....... *G01C 21/3697* (2013.01); *G01C 21/367* (2013.01); *G01C 21/3676* (2013.01); *G06Q 10/00* (2013.01); *G07C 5/008* (2013.01); *G07C 5/0841* (2013.01)

(58) Field of Classification Search
  USPC ........................... 701/424, 410, 428
  See application file for complete search history.

(56) References Cited

U.S. PATENT DOCUMENTS

| | | | | |
|---|---|---|---|---|
| 6,208,934 | B1 * | 3/2001 | Bechtolsheim .... | G01C 21/3423 |
| | | | | 340/988 |
| 7,490,005 | B2 * | 2/2009 | Harris ................ | G01C 21/3492 |
| | | | | 701/410 |
| 9,534,919 | B2 * | 1/2017 | Vanderburgh ..... | G01C 21/3676 |
| 10,127,820 | B2 * | 11/2018 | Park ........................ | B60K 35/00 |
| 2013/0054134 | A1 * | 2/2013 | Wang ................. | G01C 21/3484 |
| | | | | 701/424 |

(Continued)

FOREIGN PATENT DOCUMENTS

| | | |
|---|---|---|
| JP | 2013149077 A | 8/2013 |
| JP | 2015175824 A | 10/2015 |

(Continued)

*Primary Examiner* — Masud Ahmed
(74) *Attorney, Agent, or Firm* — Slater Matsil, LLP

(57) ABSTRACT

Provided are a system for guiding a route based on a use pattern of a driving assistant system and a method thereof. The system for guiding a route based on a use pattern of a driving assistant system includes a route generator generating at least one route to a destination when the destination is input, a per-route information integration device fusing the at least one route and use rate statistics information of the driving assistant system of each route and display the integrated information, and a display displaying a list of routes having the use rate statistics information of the driving assistant system integrated therein.

20 Claims, 13 Drawing Sheets

(56) References Cited

U.S. PATENT DOCUMENTS

| | | | | |
|---|---|---|---|---|
| 2013/0302756 A1* | 11/2013 | Takeuchi | ............ | F02D 41/1401 |
| | | | | 434/64 |
| 2014/0336933 A1* | 11/2014 | Moribe | .............. | G01C 21/3697 |
| | | | | 701/538 |
| 2014/0358321 A1* | 12/2014 | Ibrahim | .................. | G01S 19/14 |
| | | | | 701/1 |
| 2017/0001650 A1* | 1/2017 | Park | ....................... | B60W 50/08 |
| 2018/0017399 A1* | 1/2018 | Rolnik | ............... | G01C 21/3469 |

FOREIGN PATENT DOCUMENTS

| | | | |
|---|---|---|---|
| JP | 2015206655 A | 11/2015 |
| JP | 2016194813 A | 11/2016 |
| KR | 20170004715 A | 1/2017 |

* cited by examiner

SYSTEM FOR GUIDING ROUTE BASED ON USE PATTERN OF DRIVING ASSISTANT SYSTEM AND METHOD THEREOF

CROSS-REFERENCE TO RELATED APPLICATIONS

This application claims priority to Korean Patent Application No. 10-2017-0133439, filed in the Korean Intellectual Property Office on Oct. 13, 2017, which application is hereby incorporated herein by reference.

TECHNICAL FIELD

The present disclosure relates to a system for guiding a route based on a use pattern of a driving assistant system and a method thereof, and more particularly, to a technique of guiding a vehicle route on the basis of a use pattern of a driving assistant system by routes.

BACKGROUND

A vehicle refers to a transportation vehicle including every vehicle which runs on a road or a track in order to transport people or goods. Such a vehicle is typically self-propelled, i.e. driven or operated using power other than manpower or animal power. Conventionally, vehicles are driven through human operations, e.g., through operations of a handle, accelerating pedal, brake, and the like, and recently, autonomous driving technologies to control a vehicle through a computer without human intervention and a driving assistant system assisting driving have been advanced.

An advanced driver assistance system (ADAS), a driving assistant system, is a system which helps a driver to safely drive by providing an alarm sound or automatically operating a steering wheel.

However, in using the ADAS, although a service driving assistant system based on the ADAS may be provided on a road, if a driver is confused or the driving assistant system has low reliability, the ADAS is not used as the driving assistant system in many cases.

For example, when road congestion occurs in a highway, it may be proposed to use a traffic jam assistance (TJA) service of the ADAS, but, in the case of a situation in which one lane is blocked due to a vehicle accident and an interruption situation continues, an existing congestion section driving support system makes a vehicle to yield to continuously let other interrupting cars go first, so drivers may be motivated to actually turn off the congestion section driving support system to drive.

SUMMARY

The present disclosure has been made to solve the above-mentioned problems occurring in the prior art while advantages achieved by the prior art are maintained intact.

An aspect of the present disclosure provides a system for guiding a route based on a use pattern of a driving assistant system and method, capable of statistically analyzing a use rate of the driving assistant system on an actual road, extracting a pattern, and providing information regarding the use rate of the driving assistant system by routes to a driver to increase driver convenience.

Technical subjects obtainable from the present invention are non-limited by the above-mentioned technical task and other unmentioned technical tasks can be clearly understood from the following description by those having ordinary skill in the technical field to which the present invention pertains.

According to an exemplary embodiment of the present disclosure, a system for guiding a route based on a use pattern of a driving assistant system includes: a route generator configured to generate at least one route to a destination when the destination is input; a per-route information integration device configured to integrate the at least one route and use rate statistics information of the driving assistant system of each route and to form a display of the integrated information; and a display configured to a list of routes having the use rate statistics information of the driving assistant system integrated therewith.

The route generator may determine at least one route candidate by priority according to a shortest distance or a shortest time.

The per-route information integration device may display a higher use rate among a use rate of a traffic jam assist (TJA) and a use rate of a highway driving assist (HDA) in each of predetermined sections of the at least one route.

The per-route information integration device may display use rates of a driving assistant system appropriate for characteristics of each section of the route by sections.

The per-route information integration device may display differently at least one of a color of a line, a thickness of a line, and a shape of a line indicating the at least one route according to use rates of the driving assistant system by sections within the at least one route.

In each of sections of each of the at least one route, when the use rate of the driving assistant system is smaller than a first threshold value in a section, the per-route information integration device may display the corresponding section in a first color, when the use rate of the driving assistant system is equal to or greater than the first threshold value and smaller than a second threshold value greater than the first threshold value in a section, the per-route information integration device may display the corresponding section in a second color, and when use rate of the driving assistant system is equal to or greater than the second threshold value in a section, the per-route information integration device may display the corresponding section in a third color.

The per-route information integration device may integrate use rates of an idle stop and go (ISG) to each of the routes.

The per-route information integration device may integrate such that use rate statistics information of the driving assistant system is displayed in the form of a bar graph on a map displaying the route from a starting point to the destination.

The per-route information integration device may display differently at least one of a color of the line, a thickness of the line, and a shape of the line indicating the route displayed on the map according to the use rates of the driving assistant system, and display differently at least one of a color of a bar section, a thickness of the bar section, and a shape of the bar section indicating the route in the shape of the bar graph according to the use rates of the driving assistant system.

The per-route information integration device may integrate such that the use rates of the driving assistant system are displayed in number information within each of sections of the bar graph.

The per-route information integration device may integrate such that required time and distance information are displayed together in each of sections of the bar graph.

The system may further include: a route guider entering the driving assistant system mode according to a user selection when a corresponding vehicle reaches a section in which the use rate of the driving assistant system is equal to or greater than a predetermined reference value.

According to another exemplary embodiment of the present disclosure, a system for guiding a route based on a use pattern of a driving assistant system includes: a vehicle information collector collecting vehicle information and driving assistant system use information from at least one vehicle; and a driving assistant system use rate statistics analyzer analyzing driving assistant system use rate statistics of each of predetermined sections.

The system may further include: a storage storing at least one of the vehicle information, the driving assistant system use information, traffic information received from a road infrastructure, and the use rate statistics information of the driving assistant system.

The driving assistant system may include a service provided by at least one of an advanced driver assistance system (ADAS), a traffic jam assist (TJA), a highway driving assist (HDA), and an idle stop and go (ISG).

The driving assistant system use rate statistics analyzer may analyze a use rate of a system with the high use rate among a use rate of the TJA and a use rate of the HDA.

The driving assistant system use rate statistics analyzer may select a driving assistant system appropriate for characteristics of the section and analyze a use rate of the selected driving assistant system.

The system may further include: a communication device transmitting use rate analysis information of a system with a higher use rate in each section to the vehicle terminal.

According to another exemplary embodiment of the present disclosure, a method for guiding a route based on a use pattern of a driving assistant system includes: generating at least one route leading to a destination when the destination is input; fusing use rate statistics information of the driving assistant system to each of the at least one route leading to the destination; displaying the at least one integrated route; and guiding a selected route among the at least one route.

The method may further include: transmitting information about whether the driving assistant system is used to a vehicle server at a predetermined period.

The method may further include: receiving use rate statistics information of the driving assistant system from the vehicle server.

In the displaying of the at least one integrated route, use rate statistics information of the driving assistant system may be displayed in the form of a bar graph on a map indicating a route from a starting point to the destination.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
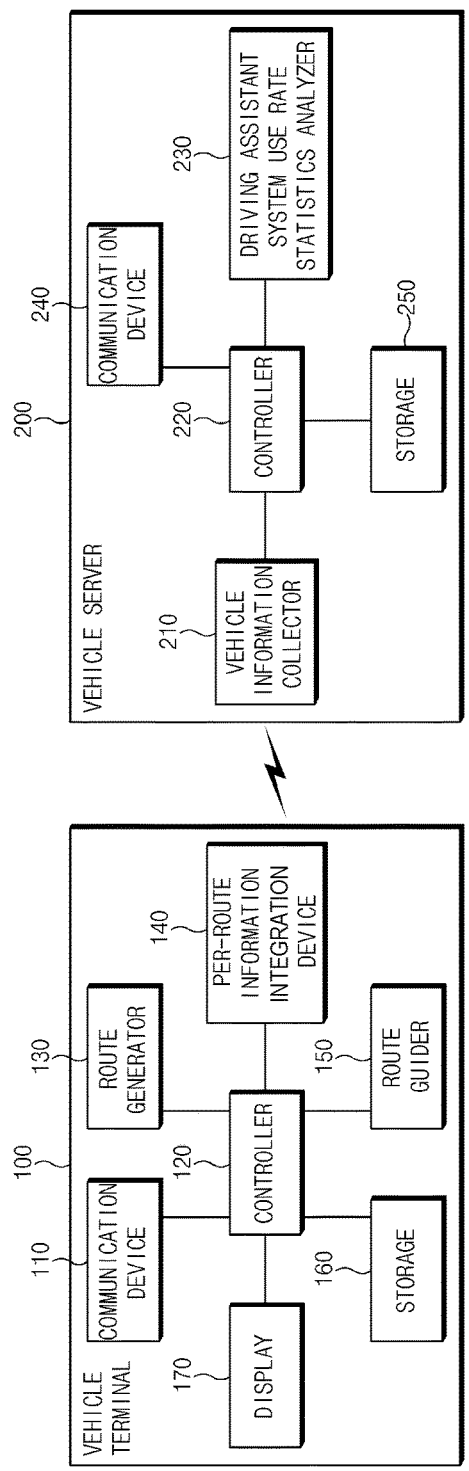
FIG. 1 is a block diagram of a system for guiding a route based on a use pattern of a driving assistant system according to an exemplary embodiment of the present disclosure.

Hereinafter, exemplary embodiments of the present disclosure will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

In describing the elements of the present invention, terms such as first, second, A, B, (a), (b), etc., may be used. Such terms are used for merely discriminating the corresponding elements from other elements and the corresponding elements are not limited in their essence, sequence, or precedence by the terms. Unless indicated otherwise, it is to be understood that all the terms used in the specification, including technical and scientific terms have the same meaning as those that are understood by those skilled in the art to which the present invention pertains. It should be understood that the terms defined by the dictionary may be but are not always identical with the meanings within the context of the related art, and the terms used herein should not be ideally or excessively formally defined unless the context clearly dictates otherwise.

Hereinafter, exemplary embodiments of the present disclosure will be described in detail with reference to FIGS. 1 to 10.

Figure 2:
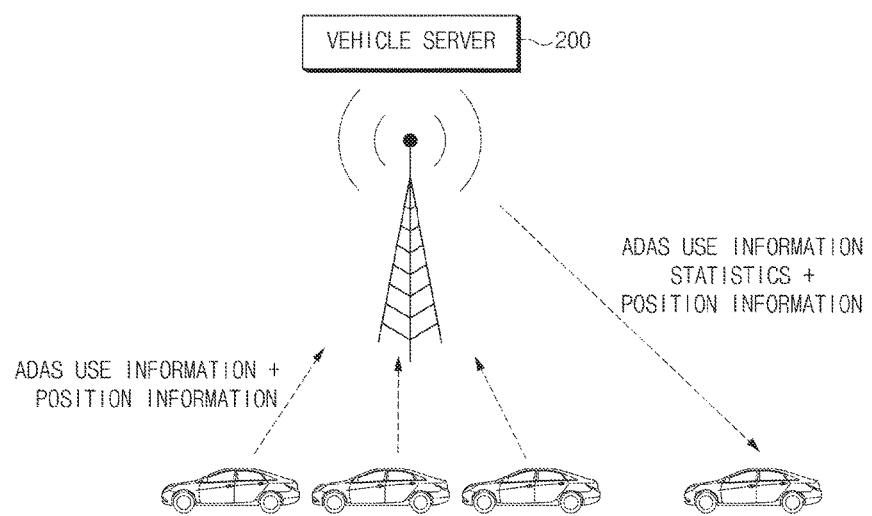
FIG. 2 illustrates a relation between vehicles for guiding a route based on a use pattern of a driving assistant system and a vehicle server according to an exemplary embodiment of the present disclosure.

FIG. 1 is a block diagram of a system for guiding a route based on a use pattern of a driving assistant system according to an exemplary embodiment of the present disclosure, and FIG. 2 illustrates a relation between vehicles for guiding a route based on a use pattern of a driving assistant system and a vehicle server according to an exemplary embodiment of the present disclosure.

Referring to FIGS. 1 and 2, the system for guiding a route based on a use pattern of a driving assistant system according to an exemplary embodiment of the present disclosure includes a vehicle terminal 100 transmitting vehicle information and driving assistant system use information to a vehicle server 200, receiving use rate statistics information of the driving assistant system by routes from the vehicle server 200, and fusing the received use rate statistics information of the driving assistant system to routes to display the same, and the vehicle server 200 analyzing use rate statistics of the driving assistant system by positions when the vehicle information and the driving assistant system use information are received from the vehicle terminal 100.

Here, the driving assistant system may include a service provided by at least one of a driving support system (i.e., an advanced driver assistance system (ADAS)), a congested section driving support system (i.e., a traffic jam assist (TJA)), a highway driving support system (i.e., a highway driving assist (HDA)), and an idle stopping device (i.e., idle stop and go (ISG)).

Also, the vehicle information may include vehicle position information, vehicle speed information, and the like, and the driving assistant system use information may include information regarding whether the driving assistant system is in use. Here, the information regarding whether the driving assistant system is in use may include whether the TJA is in use in each section forming a route, whether the HDA is in use, whether the ISG is in use, and the like.

Referring to FIG. 1, the vehicle terminal 100 includes a communication device no, a controller 120, a route generator 130, a per-route information integration device 140, a route guider 150, storage 160, and a display 170.

The communication device 110 performs communication with the vehicle server 200. Here, the communication device no may periodically transmit driving assistant system use information to the vehicle server 200 and periodically receive driving assistant system use rate statistics information from the vehicle server 200.

The controller 120 controls a general operation of each component.

When a destination is received from a driver, the route generator 130 generates a route to the destination. Here, the route generator 130 may generate at least one route on the basis of information regarding time and distance to reach the destination, and may determine priority levels of the routes according to a shortest distance or a shortest time. To this end, the route generator 130 may generate a route using location information of the vehicle with which the route generator is associated, map information, traffic information received from a road infrastructure (camera, sensor, etc.), and the like.

The per-route information integration device 140 integrates the driving assistant system use rate statistics information received from the vehicle server 200 to the route generated by the route generator 130.

Also, the per-route information integration device 140 may integrate data such that a higher use rate among those of the TJA and HDA in each section of the at least one route that is displayed.

Also, the per-route information integration device 140 may integrate route data and the use rate of the driving assistant system such that use rate statistics information of the driving assistant system may be displayed in a bar graph on a partial screen of a map displaying a route from a starting point to a destination. Here, the use rate statistics information of the driving assistant system may be displayed in number or may be displayed in a separate or distinguishable display area, or the like, rather than as a number. Thus, the driver may view the use rate of the driving assistant system at a glance.

Figure 3:
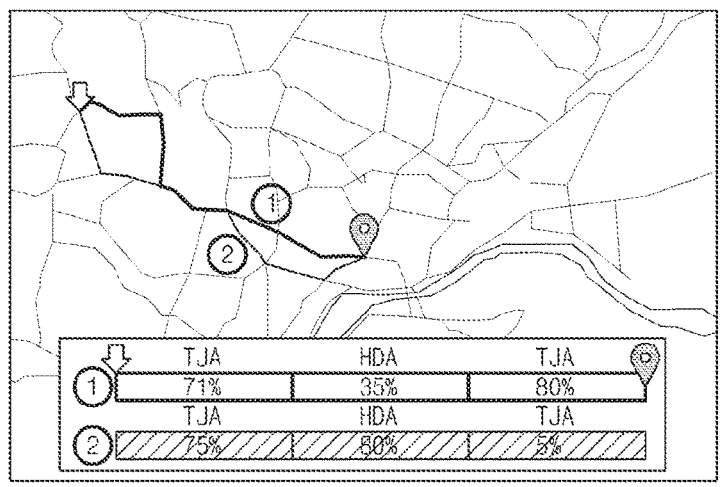
FIG. 3 illustrates routes including use rate statistics information of a driving support system (i.e., an advanced driver assistance system (ADAS)) by routes according to an exemplary embodiment of the present disclosure.
Figure 3:
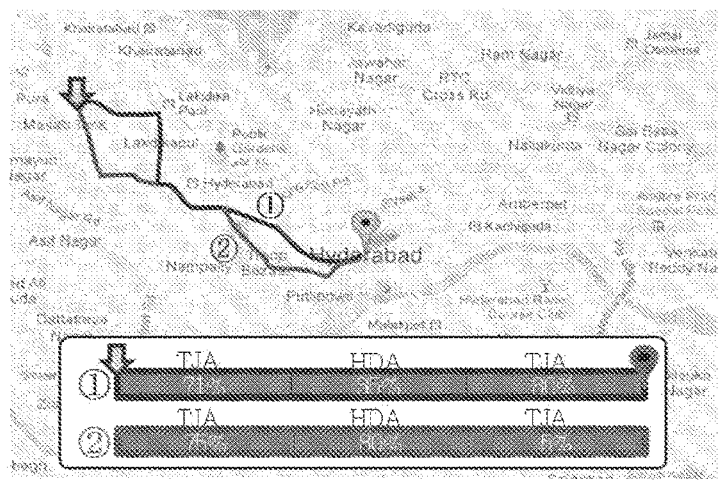

FIG. 3 illustrates routes including use rate statistics information of a driving support system (i.e., an advanced driver assistance system (ADAS)) by routes according to an exemplary embodiment of the present disclosure.

Referring to FIG. 3, route ① and route ② are generated and displayed on a map and the use rates of the driving assistant system in each section regarding the route ① are classified as 71%, 35%, and 80% and displayed. That is, in three sections, a first section has a use rate of the TJA which is as high as 71%, a second section has a use rate of the HDA which is 35%, and a third section has a use rate of the TJA which is 80%. Here, in the route ②, a first section has a use rate of the TJA which is 75%, a second section has a use rate of the HDA which is 80%, and a third section has a use rate of the TJA which is 5%. Thus, the driver may check the use rates of the TJA or the HDA in the routes and select a desired route. Also, when the route ① is highlighted on the map (e.g., indicated in a different color such as blue a different line style or the like), the bar graph showing the use rates of the driving assistant system of the sections regarding the route ① may also be highlighted in a similar manner (e.g., also displayed in blue, in a different font or style or the like). That is, the line of the routes on the map and the display part of the use rates of the driving assistant system on the bar graph may be displayed in the same highlighted manner.

The per-route information integration device 140 may display differently at least one of a color of the line, a thickness of the line, and a shape of the line indicating at least one route according to the use rates of the driving assistant system of each section within the route. That is, it can be seen that, in each section of each of the at least one route, when the use rate of the driving assistant system is smaller than a first threshold value in a section, the per-route information integration device 140 may display the corresponding section in a first manner (e.g., the section is colored red or displayed using a dotted line, etc.), when the use rate of the driving assistant system is equal to or greater than the first threshold value and smaller than a second threshold value greater than the first threshold value in a section, the per-route information integration device 140 may display the corresponding section in a second manner (e.g., the section is colored yellow or displayed using a dashed line, etc.), and when use rate of the driving assistant system is equal to or greater than the second threshold value in a section, the per-route information integration device 140 may display the corresponding section in yet a third manner (e.g., the section is colored green or displayed using a solid line, etc.).

The per-route information integration device 140 may integrate data to display differently at least one of a color of the line, a thickness of the line, and a shape of the line indicating the route displayed on the map according to the use rates of the driving assistant system, and display differently at least one of a color of a bar section, a thickness of the bar section, and a shape of the bar section indicating the route in the shape of the bar graph according to the use rates of the driving assistant system.

Figure 4:
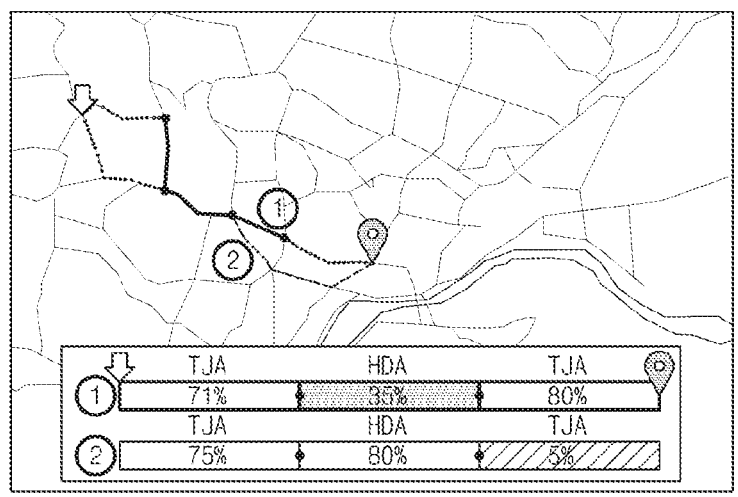
FIG. 4 illustrates that use rates of an ADAS in each section of routes are shown in different colors according to an exemplary embodiment of the present disclosure.
Figure 4:
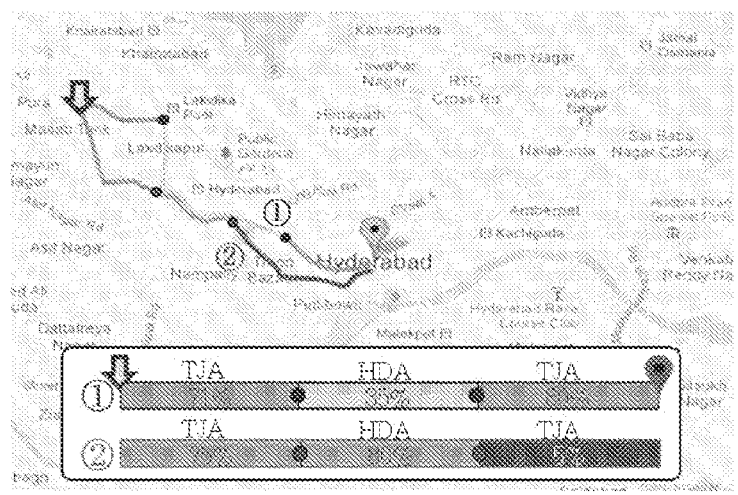

FIG. 4 illustrates that use rates of an ADAS in each section of routes are shown in different colors according to an exemplary embodiment of the present disclosure. Referring to FIG. 4, in the route ①, a first section in which the use rate of the driving assistant system is 71% and a third section in which the use rate of the driving assistant system is 80% are displayed in a first manner (e.g., colored green as indicated by cross-hatching in FIG. 4), while the second section in which the use rate of the driving assistant system is 35% is displayed in a different manner (e.g., colored yellow as indicated by different cross-hatching in FIG. 4). Also, the sections of the route on the map are distinguished from each other in the same manner as that of the bar graph (e.g., different display colors, different line styles or the like).

Figure 5:
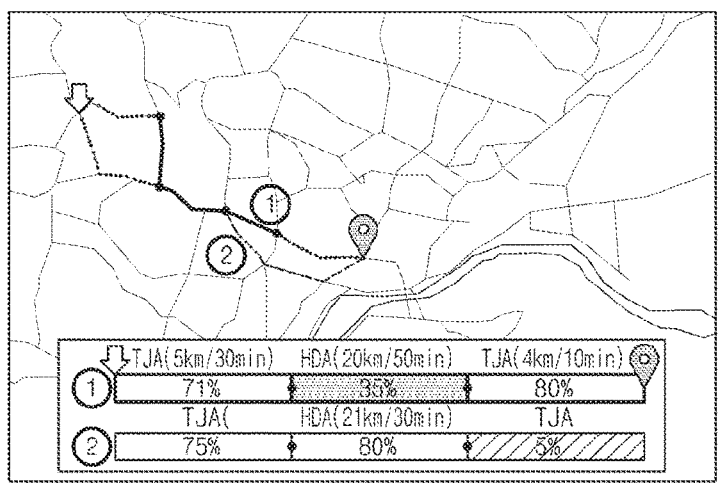
FIG. 5 illustrates uses rate of an ADAS, required time, and distance information in each section of routes together according to an exemplary embodiment of the present disclosure.
Figure 5:
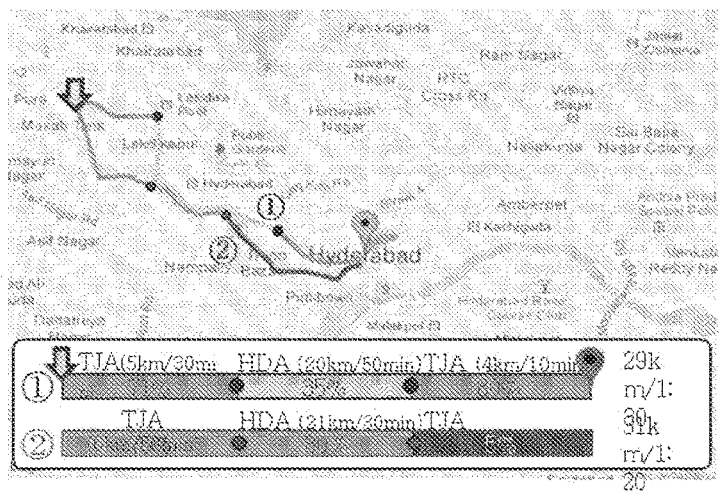

Also, the per-route information integration device 140 may integrate route information and use rate statistics information of the driving assistant system such that required time and distance information of each section of the bar graph are displayed together. FIG. 5 illustrates uses rate of an ADAS, required time, and distance information in each section of routes together according to an exemplary embodiment of the present disclosure. Referring to FIG. 5, in the route ①, 5 km/30 min is indicated in the first section, and distance and required time are indicated in each section, whereby the driver may check or view the required time and distance information at a glance.

Figure 6:
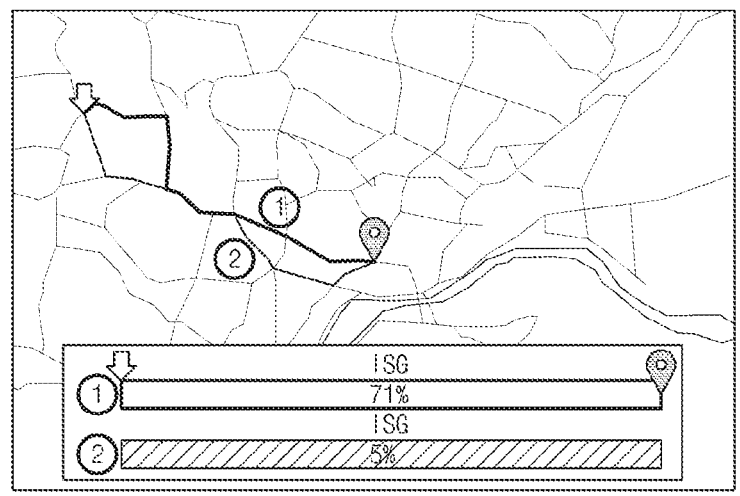
FIG. 6 illustrates use rate statistics information of an idle stop and go (ISG) in each section of routes according to an exemplary embodiment of the present disclosure.
Figure 6:
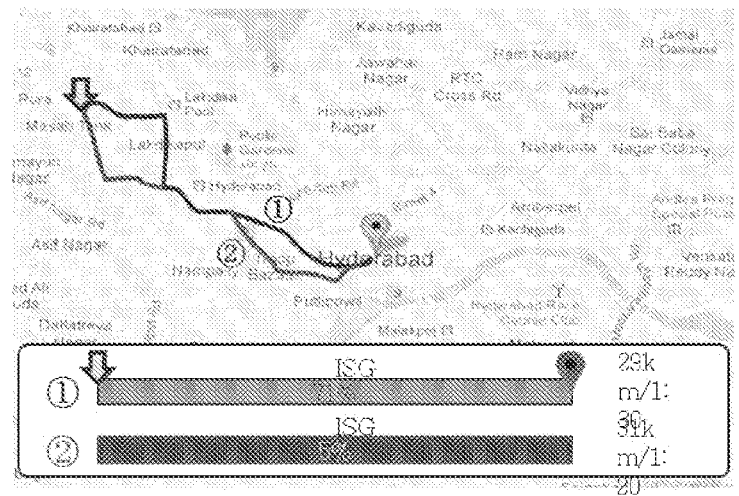

Also, the per-route information integration device 140 may integrate a use rate of the ISG and a route. FIG. 6 illustrates use rate statistics information of an idle stop and go (ISG) in each section of routes according to an exemplary embodiment of the present disclosure. Referring to FIG. 6, it can be seen that a use rate of the ISG in the route ① is 71% and a use rate of the ISG in the route ② is 5%.

The ISG refers to a scheme in which when a vehicle is stopped, engine ignition is turned off so an engine is stopped and in some instances a motor is driven using a battery while the engine is stopped, and when the vehicle starts (e.g., when the brake pedal is released), engine ignition is turned on. Since energy wasted due to idle rotation accounts for about 10 to 15% of vehicle fuel, the use of ISG advantageously increases fuel efficiency and reduces exhaust gas, and thus, the ISG has increasingly been installed in vehicles.

However, the use of the ISG generates vibrations when engine ignition is turned on or off. Thus, in an area with many traffic lights, engine ignition may be frequently turned on or off, and thus, the driver may turn off the ISG to reduce inconvenience. Thus, in the present disclosure, information regarding ISG use statistics of each route is provided to allow the driver to select (or determine) whether to use the ISG in advance.

The route guider 150 guides a selected route and when the vehicle enters a section with a high use rate of the driving assistant system, the route guider 150 performs control to display a screen allowing the driver to select whether to enter the driving assistant system use mode.

The storage 160 stores route information, use rate statistics information of the driving assistant system, integrated route information, and the like.

The display 170 displays a list of routes integrated by the per-route information integration device 140 and a screen for selecting whether to enter the driving assistant system use mode provided by the route guider 150.

The vehicle server 200 receives vehicle information and driving assistant system use information and analyzes use rate statistics information of the driving assistant system of each position (or each section). Here, the section may be divided into a highway, a general road, a congested road, and the like, according to types of road congestion situations, and the like. Here, use rate statistics of the driving assistant system appropriate for each section are stored and provided to the vehicle terminal 100. For example, in a highway section, a use rate of the HDA may be provided, and in a congested section, a use rate of the TJA may be provided. That is, the vehicle server 200 may analyze and store use rates of the driving assistant system appropriate for characteristics of each section. Referring to FIG. 3, it can be seen that, in the route ①, the TJA system is selected in the first section, the HDA system is selected in the second section, and the TJA system is selected in the third section, so that the use rates of the selected systems are provided, respectively. Also, in the route ②, the TJA system is selected in the first section, the HDA system is selected in the second section, and the TJA system is selected in the third section, and the use rates of the selected systems are provided, respectively.

To this end, the vehicle server 200 includes a vehicle information collector 210, a controller 220, a driving assistant system use rate statistics analyzer 230, a communication device 240, and storage 250.

The vehicle information collector 210 may collect vehicle information (vehicle position information, vehicle speed information, etc.) and driving assistant system use information from the vehicle terminal 100 and collect road construction information, traffic information, and the like, from a road infrastructure (camera, sensor, etc.).

The controller 220 may control a general operation of each component.

The driving assistant system use rate statistics analyzer 230 receives the vehicle information and the driving assistant system use information collected by the vehicle information collector 210 and analyzes use rate statistics information of the driving assistant system of each position (each section). That is, the driving assistant system use rate statistics analyzer 230 may periodically receive information regarding use of driving assistant system at each position from vehicle terminals of vehicles which drive various positions, analyze use statistics of the driving assistant system at each position, and calculate use rate statistics information of the driving assistant system of each section defined by dividing the corresponding positions by a predetermined distance. For example, when a distance from a starting point to a destination is divided into equal parts as three sections, use rate statistics information of the driving assistant system at each position within each section may be collected to become use rate statistics information of the driving assistant system of each section.

In another example, a route from a starting point to a destination is divided into sections according to road characteristics, a congested situation, and the like, a driving assistant system (HDA or TJA) appropriate for each section is selected, and a use rate of the selected driving assistant system may be analyzed to calculate statistics information.

Also, the driving assistant system use rate statistics analyzer 230 may analyze a use rate of a system with a high use rate among use rates of the TJA and the HDA in each section. Referring to FIG. 3, it can be seen that, in the first section of each route, the use rate of the TJA is higher than that of the HDA, and thus, the use rate of the TJA is displayed.

The communication device 240 performs communication with the vehicle terminal 100. Driving assistant system use information corresponding to a vehicle position may be received from the vehicle terminal 100 of each of a plurality of vehicles at a predetermined period.

The storage 250 may store vehicle information, driving assistant system use information, traffic information received from a road infrastructure, use rate statistics information of the driving assistant system, and the like.

Figure 7:
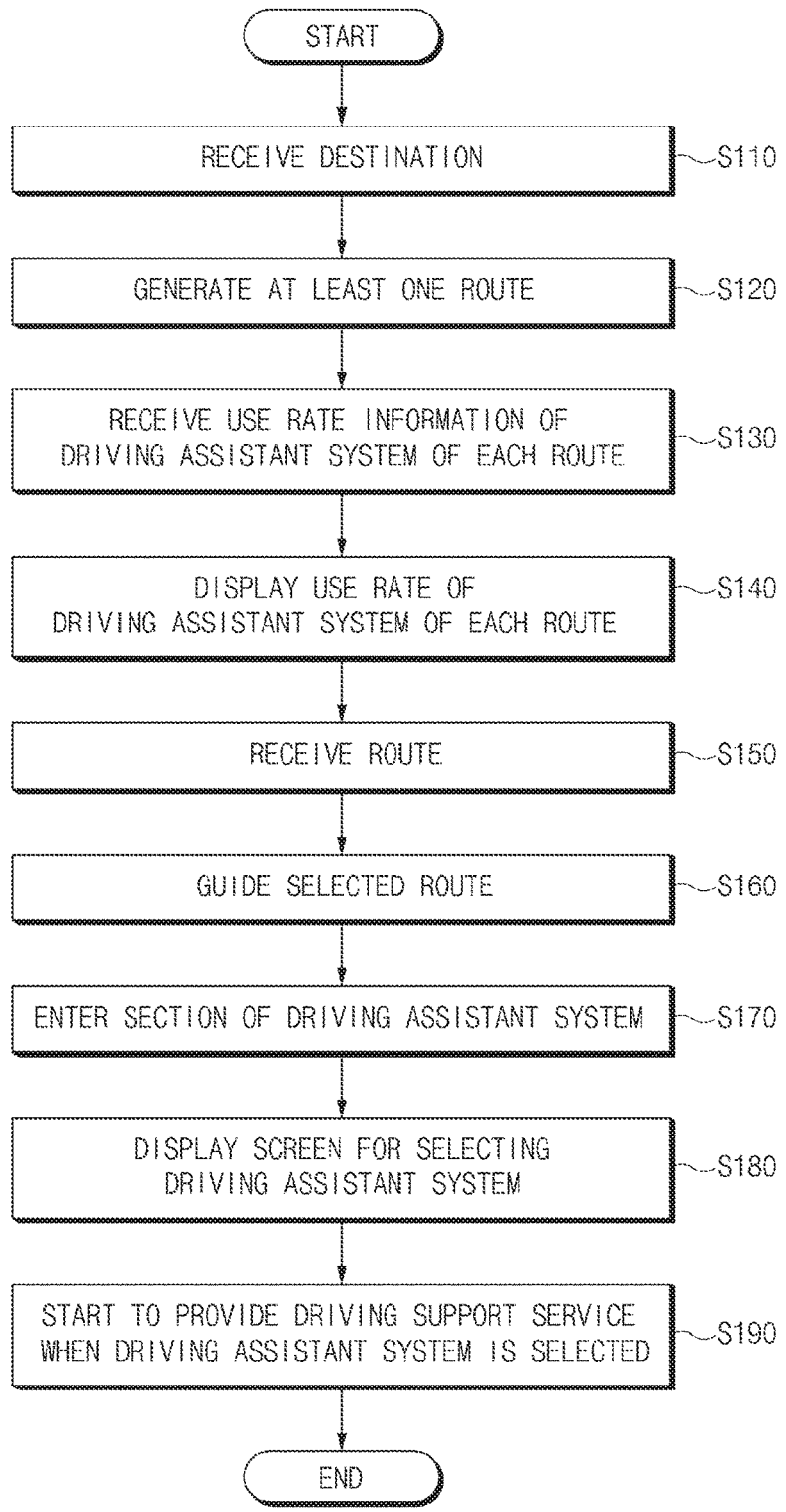
FIG. 7 is a flow chart illustrating an operating method of a vehicle terminal guiding a route based on a use pattern of a driving assistant system according to an exemplary embodiment of the present disclosure.

Hereinafter, an operating method of the vehicle terminal guiding a route based on a use pattern of a driving assistant system use pattern according to an exemplary embodiment of the present disclosure will be described. FIG. 7 is a flow chart illustrating an operating method of a vehicle terminal guiding a route based on a use pattern of a driving assistant system according to an exemplary embodiment of the present disclosure.

Figure 9A:
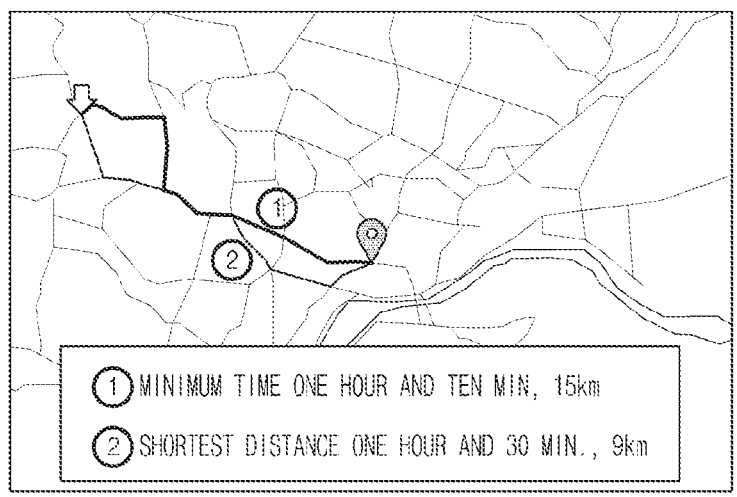
FIG. 9A illustrates a plurality of routes generated using time and a distance to a destination according to an exemplary embodiment of the present disclosure.
Figure 9A:
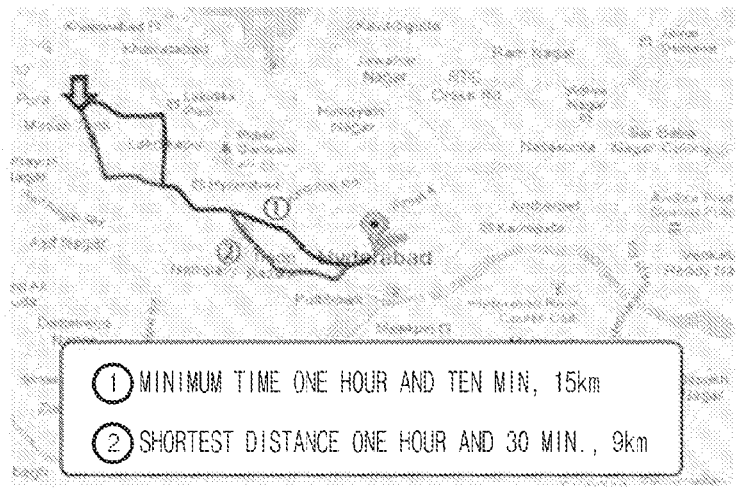

Referring to FIG. 7, when a destination is received from a driver (S110), the vehicle terminal 100 generates at least one route using required time and distance to reach the destination from a starting point in operation S120. FIG. 9A illustrate a plurality of routes generated using time and a distance to a destination according to an exemplary embodiment of the present disclosure. Referring to FIG. 9A, it can be seen that, the vehicle terminal 100 displays a route ① based on a minimum time and a route ② based on a shortest distance together with route information on a map.

Figure 9B:
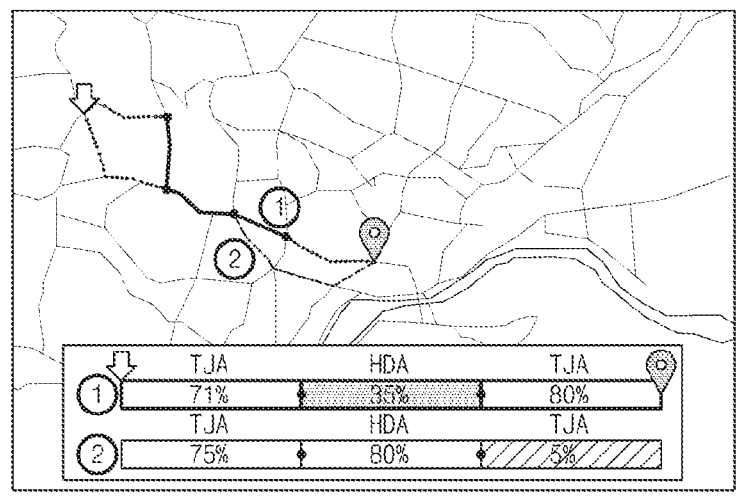
FIG. 9B illustrates use rates of a driving assistant system indicated on a map of a plurality of routes of FIG. 9A.
Figure 9B:
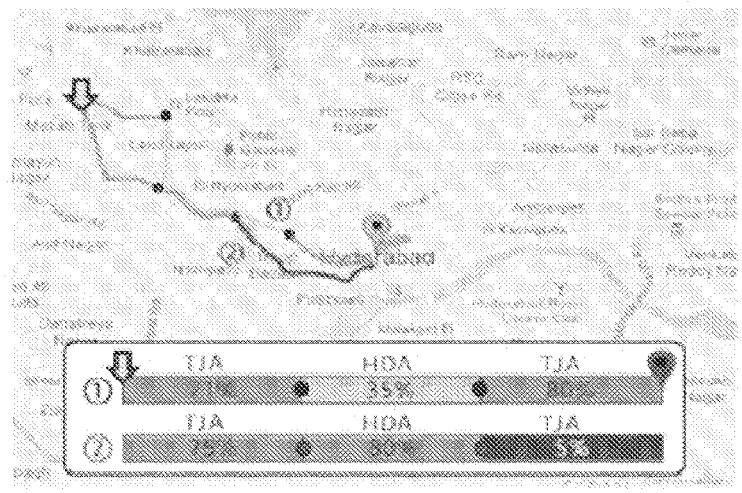

Thereafter, the vehicle terminal 100 receives the information regarding the use rate of the driving assistant system of each route from the vehicle server 200 in operation S130, integrates the received information regarding the use rate of the driving assistant system of each route to at least one generated route, and displays the same on the route in operation S140. That is, at least one route is displayed, and here, the use rate statistics information of the driving assistant system of each route is also displayed together so that the driver may refer to it to select a route. FIG. 9B illustrates use rates of a driving assistant system indicated on a map of a plurality of routes of FIG. 9A. Referring to FIG. 9B, it can be seen that the use rates of the driving assistant system in each section of the route ① and the route ② are displayed in different manners1 (e.g., different colors or the like as indicated by cross-hatching in the figures).

Accordingly, the driver may view or check the use rates of the driving assistant system at a glance through the routes on the map and the bar graphs.

Figure 9C:
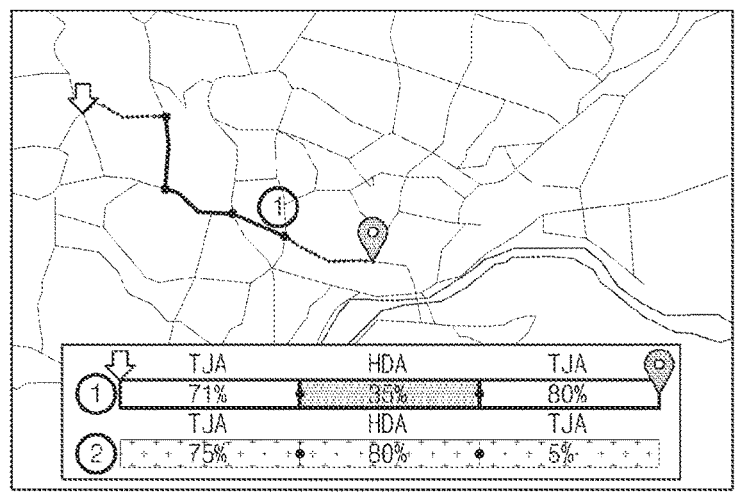
FIG. 9C illustrates selection of one of a plurality of routes of FIG. 9B.
Figure 9C:
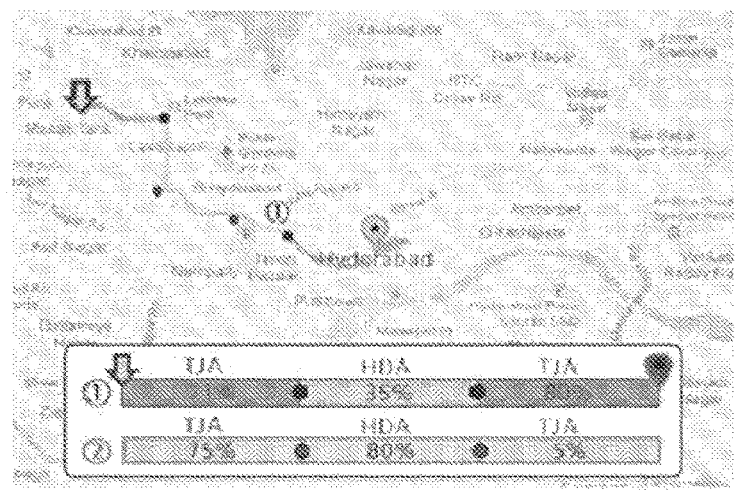

Thus, when the driver selects a route, the vehicle terminal 100 guides (e.g., navigates or otherwise directs the vehicle along) the selected route in operation S160. FIG. 9C illustrates selection of one of the plurality of routes of FIG. 9B. Referring to FIG. 9C, as the route (is selected, only the route ① is displayed on the map and the route ① is activated and the route ② is deactivated in the bar graphs.

Thereafter, when the vehicle enters a section with a high use rate of the driving assistant system during route guiding S170, the vehicle terminal 100 displays a screen for selecting the use of the driving assistant system in operation S180, and when the driver selects the use of the driving assistant system through the driving assistant system use selection screen, the vehicle enters the driving assistant system mode in operation S190. Meanwhile, when the use of the driving assistant system is not selected, the driver directly drives the vehicle.

Figure 9D:
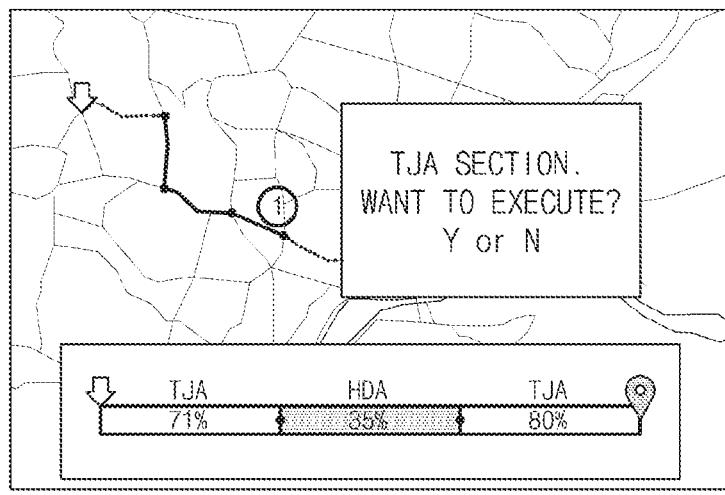
FIG. 9D illustrates a screen displayed for a driver to select whether to enter a driving assistant system use mode when the driver enters a section with a high use rate of the driving assistant system during route guiding according to an exemplary embodiment of the present disclosure.
Figure 9D:
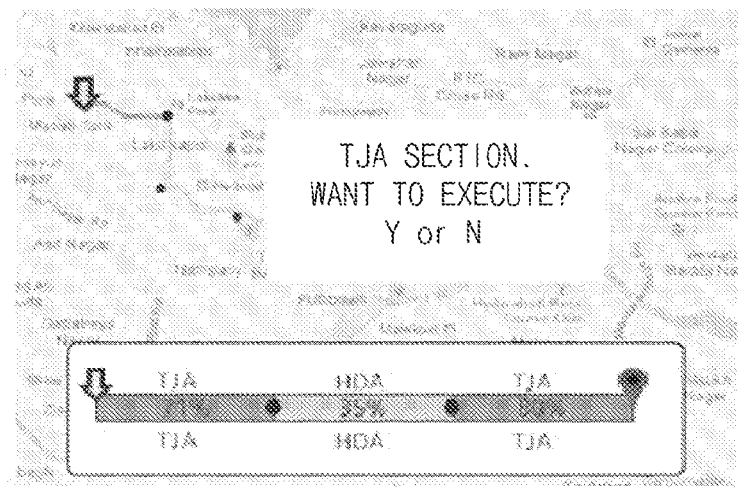

FIG. 9D illustrates a screen displayed for a driver to select whether to enter a driving assistant system use mode when the driver enters a section with a high use rate of the driving assistant system during route guiding according to an exemplary embodiment of the present disclosure. Referring to FIG. 9D, when the vehicle enters a first section in which the use rate of the TJA is 71%, a screen asking the driver about whether to use the TJA may be provided to allow the driver to select whether to use the TJA.

Figure 8:
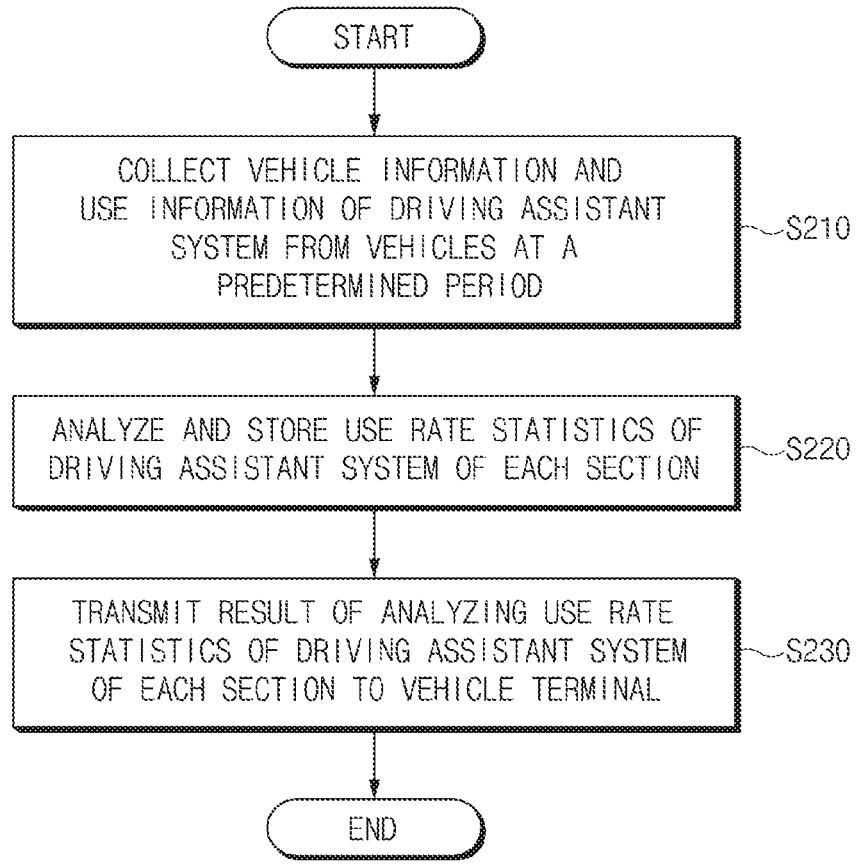
FIG. 8 is a flow chart illustrating an operating method of a vehicle server which collects and analyzes use rate statistics of a driving assistant system according to an exemplary embodiment of the present disclosure.

Hereinafter, an operating method of the vehicle server which collects and analyzes use rate statistics of the driving assistant system according to an exemplary embodiment of the present disclosure will be described with reference to FIG. 8. FIG. 8 is a flow chart illustrating an operating method of a vehicle server which collects and analyzes use rate statistics of the driving assistant system according to an exemplary embodiment of the present disclosure.

Referring to FIG. 8, the vehicle server 200 collects vehicle information and driving assistant system use information from the vehicle terminal 100 at a predetermined period in operation S210. For example, the vehicle terminal 100 may provide driving assistant system use information to the vehicle server 200 at every 500 meters of a vehicle driving distance.

Thereafter, the vehicle server 200 analyzes the use rate statistics of the driving assistant system of each section and stores the same in operation S220.

Here, the section may include a section from a starting point to a point of ⅓ of the entire route, a section from the point of ⅓ to a point of ⅔, a section from the point of ⅔ to a destination, and the like, at every predetermined distance (e.g., at every 100 kilometers). Also, here, the section may be set by distinguishing between types of road, i.e., a highway and a general road. Here, the use rate statics of the driving assistant system appropriate for each section are stored and provided to the vehicle terminal 100. For example, a use rate of the HDA may be provided in a section of a highway, and a use rate of the TJA may be provided in a congested section. That is, the vehicle server 200 may analyze use rates of the driving assistant system appropriate for the characteristics of each section and store the same.

Thereafter, the vehicle server 200 transmits the use rate statistics information of the driving assistant system of each section to the vehicle terminal 100 in operation S230. Here, when the use rate statistics information of the driving assistant system of each section is requested by the vehicle terminal 100, the vehicle server 200 may provide the use rate statistics information of the driving assistant system of each section within a route from a starting point to a destination of the corresponding vehicle terminal 100.

In the present disclosure, the HDA, the TJA, and the ISG are described as the driving assistant system, for example, but the present disclosure is not limited thereto and may include various autonomous driving control services such as a lane departure warning system (LDWS), a lane keeping assist system (LKAS), blind spot detection (BSD), advanced smart cruise control (ASCC), autonomous emergency braking (AEB), advanced driver assistance system (ADAS), and the like.

In this manner, although the vehicle is on a road in which the driving assistant system may be used, in the case of a lot of driving vehicles, in the case of a crossroad, in the case of a road which people frequently cross, in the case of road construction, in the case of heavy snow/rain conditions, drivers may have difficulty in relying on the driving assistant system and turn off the driving assistant system to directly drive the vehicle, and here, in the present disclosure, statistics of a road section with a high use rate of the driving assistant system and a road section with a low use of the driving assistant system are analyzed and provided to the driver in advance, so that the driver may drive safely.

Also, since the use rates of the driving assistant system are displayed so as to be recognized at a glance on a route, driver convenience may be enhanced.

Also, as illustrated in FIG. 5, since the use rates of the driving assistant system of each section are displayed, the driver may reach the destination using the TJA in the first section of the route ②, the HDA in the second section of the route ②, and the TJA in the third section of the route ① upon changing the route from the route ② to the route ①. That is, the routes may be combined such that the driving assistant system function may be smoothly used according to the use rates of the driving assistant system.

Also, in the present disclosure, after the driver starts driving, whenever the driver enters the driving assistant system mode in the sections of each route, the driver may be allowed to determine whether to execute the driving assistant system mode in each section, and when the driver selects to execute the driving assistant system mode, the driver may enter the corresponding driving assistant system mode.

In this manner, in the present disclosure, a driving assistant system use status on a route to which the driver wants to go may be recognized at a glance by intuition and reflected for route selection, and since driving assistant system use information of a corresponding vehicle, rather than driving assistant system use information obtained from a road infrastructure or vehicle sensor information, is collected from each vehicle terminal, reliability of driving assistant system use information is high.

Figure 10:
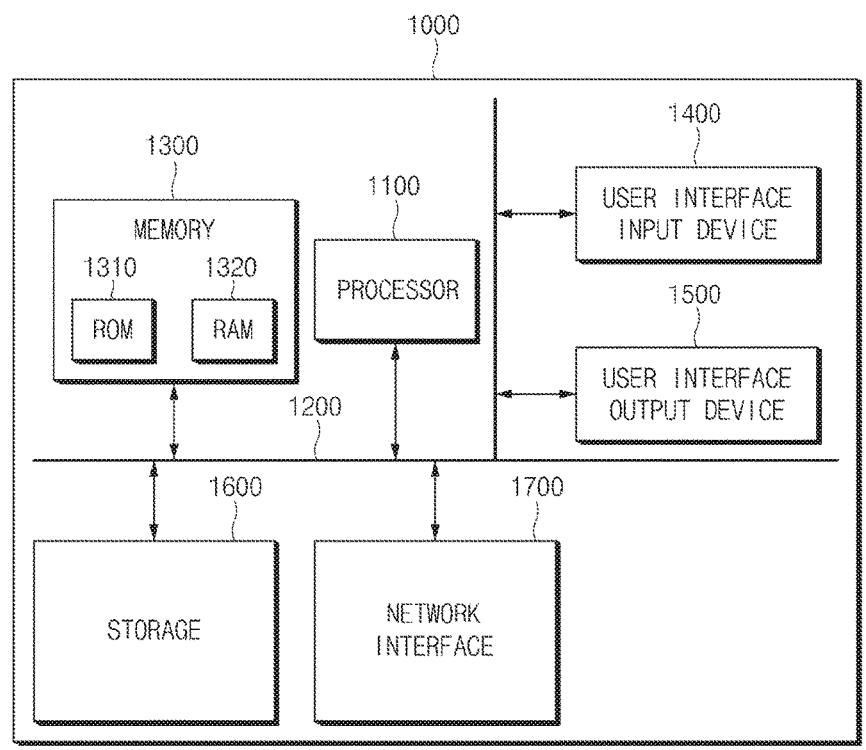
FIG. 10 is a block diagram of a computer system employing a method for guiding a route based on a use pattern of a driving assistant system according to an exemplary embodiment of the present disclosure.

FIG. 10 is a block diagram of a computer system employing a method for guiding a route based on a use pattern of a driving assistant system according to an exemplary embodiment of the present disclosure. Referring to FIG. to, a computing system 1000 may include at least one processor 1100, a memory 1300, a user interface input device 1400, a user interface output device 1500, a storage 1600, and a network interface 1700 connected through a bus 1200.

The processor 1100 may be a central processing unit (CPU) or a semiconductor device executing commands stored in the memory 1300 and/or the storage 1600. The memory 1300 and the storage 1600 may include various types of volatile or non-volatile storage medium. For example, the memory 1300 may include a read-only memory (ROM) and a random access memory (RAM).

Thus, steps of a method or algorithm described in relation to the exemplary embodiments disclosed in this disclosure may be directly implemented by hardware and a software module executed by the processor 1100 or by combining two thereof. The software module may reside in a storage medium (i.e., the memory 1300 and/or the storage 1600) such as a RAM memory, a flash memory, a ROM memory, an EPROM memory, an EEPROM memory, a register, a hard disk, a detachable disk, a CD-ROM, and the like.

The illustrated storage medium may be coupled to the processor 1100, and the processor 1100 may read information from the storage medium and write information into the storage medium. In another method, the storage medium may be integrated with the processor 1100. The processor and storage medium may reside within an ASIC. The ASIC may reside within a user terminal. In another method, the processor and the storage medium may reside as separate components within a user terminal.

As described above, since the use rate of the driving assistant system is statistically analyzed on an actual road and information thereof of each route is provided to a driver, the driver may recognize a route in which the driving assistant system can be smoothly performed in advance and apply the driving assistant system, increasing driver convenience.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for guiding a vehicle along a route based on a use pattern of a driving assistant system, the system comprising:
   a route generator configured to generate at least one route to a destination when the destination is input;
   a per-route information integration device configured to integrate the at least one route and use rate statistics information of the driving assistant system for the at least one route and to prepare the integrated information for display, wherein the per-route information integration device is further configured to prepare for display a higher use rate among a use rate of a traffic jam assist (TJA) and a use rate of a highway driving assist (HAD) in predetermined sections of the at least one route; and
   a display configured to display a list of routes having the use rate statistics information of the driving assistant system integrated therewith.

2. The system according to claim 1, wherein the route generator is configured to determine at least one route candidate by priority according to a shortest distance or a shortest time.

3. The system according to claim 1, wherein the per-route information integration device is configured to prepare for display use rates of a driving assistant system based upon characteristics of each section of the route, the use rates being determined on a section by section basis.

4. The system according to claim 1, wherein the system is configured to display differently at least one of a color of a line, a thickness of a line, and a shape of a line indicating the at least one route according to use rates of the driving assistant system by sections within the at least one route.

5. The system according to claim 4, wherein, for each section of the at least one route, when a use rate of the driving assistant system is less than a first threshold value, the system displays the section in a first color, when the use rate of the driving assistant system is equal to or greater than the first threshold value and less than a second threshold value greater than the first threshold value, the system displays the section in a second color, and when the use rate of the driving assistant system is equal to or greater than the second threshold value, the system displays the section in a third color.

6. The system according to claim 1, wherein the per-route information integration device is configured to integrate use rates of an idle stop and go (ISG) for the at least one route.

7. The system according to claim 1, wherein the per-route information integration device is configured such that use rate statistics information of the driving assistant system is displayed in the form of a bar graph on a map displaying the route from a starting point to the destination.

8. The system according to claim 7, wherein the system is configured to display differently at least one of a color of a line, a thickness of the line, and a shape of the line indicating the route displayed on the map according to the use rates of the driving assistant system, and further to display differently at least one of a color of a bar section, a thickness of the bar section, and a shape of the bar section indicating the route in the shape of the bar graph according to the use rates of the driving assistant system.

9. The system according to claim 8, wherein the per-route information integration device is configured such that the use rates of the driving assistant system are displayed in number information within sections of the bar graph.

10. The system according to claim 8, wherein the per-route information integration device is configured such that required time and distance information are displayed together in sections of the bar graph.

11. The system according to claim 1, further comprising:
a route guider configured to enter a driving assistant system mode according to a user selection when a corresponding vehicle reaches a section of the at least one route in which the use rate of the driving assistant system is equal to or greater than a predetermined reference value.

12. The system according to claim 1, wherein displaying the at least one integrated route comprises differently displaying a color of a line, a thickness of a line, or a shape of a line to indicate the at least one route according to use rates of the driving assistant system by sections within the at least one route.

13. A system for guiding a vehicle along a route based on a use pattern of a driving assistant system, the system comprising:
a vehicle information collector configured to collect vehicle information and driving assistant system use information from at least one vehicle; and
a driving assistant system use rate statistics analyzer configured to analyze driving assistant system use rate statistics of predetermined sections of the route, wherein the driving assistant system includes a service selected from the group consisting of an advanced driver assistance system (ADAS), a traffic jam assist (TJA), a highway driving assist (HDA), an idle stop and go (ISG), and combinations thereof.

14. The system according to claim 13, further comprising:
a storage device configured to store at least one of the vehicle information, the driving assistant system use information, traffic information received from a road infrastructure, and the use rate statistics.

15. The system according to claim 13, wherein the driving assistant system use rate statistics analyzer is configured to determine a high use rate among a use rate of the TJA and a use rate of the HDA.

16. The system according to claim 13, wherein the driving assistant system use rate statistics analyzer is configured to select a driving assistant system based upon characteristics of a section of the route and further configured to analyze a use rate of the selected driving assistant system.

17. A method for guiding a vehicle based on a use pattern of a driving assistant system, the method comprising:
generating at least one route leading to a destination;
integrating use rate statistics information of the driving assistant system with each of the at least one route leading to the destination to form at least one integrated route;
displaying the at least one integrated route by displaying a higher use rate among a use rate of a traffic jam assist (TJA) and a use rate of a highway driving assist (HAD) in predetermined sections of the at least one route; and
guiding the vehicle along a selected route among the at least one route.

18. The method of claim 17, further comprising:
transmitting whether the driving assistant system is used to a vehicle server at a predetermined period; and
receiving use rate statistics information of the driving assistant system from the vehicle server.

19. The method of claim 17, wherein displaying the at least one integrated route comprises displaying use rate statistics information of the driving assistant system in the form of a bar graph on a map indicating a route from a starting point to the destination.

20. The method according to claim 17, wherein generating at least one route leading to a destination comprises determining at least one route candidate by priority according to a shortest distance or a shortest time.

* * * * *